April 19, 1960  C. B. HARKER  2,933,220
DISPENSING DEVICE
Filed July 3, 1957  2 Sheets-Sheet 1
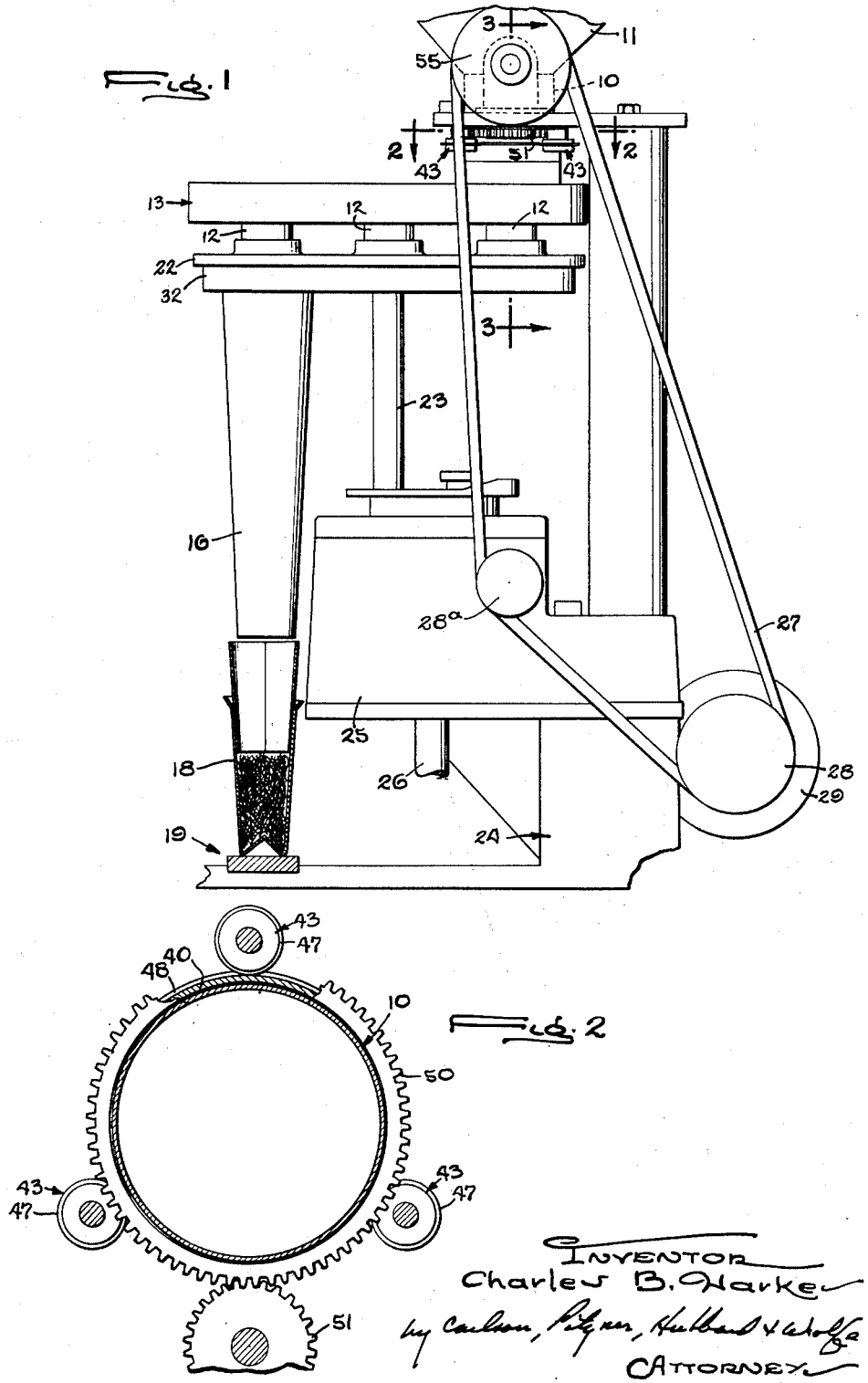
INVENTOR
Charles B. Harker
by Carlson, Pitzner, Hubbard & Wolfe
ATTORNEYS April 19, 1960 C. B. HARKER 2,933,220
DISPENSING DEVICE
Filed July 3, 1957 2 Sheets-Sheet 2
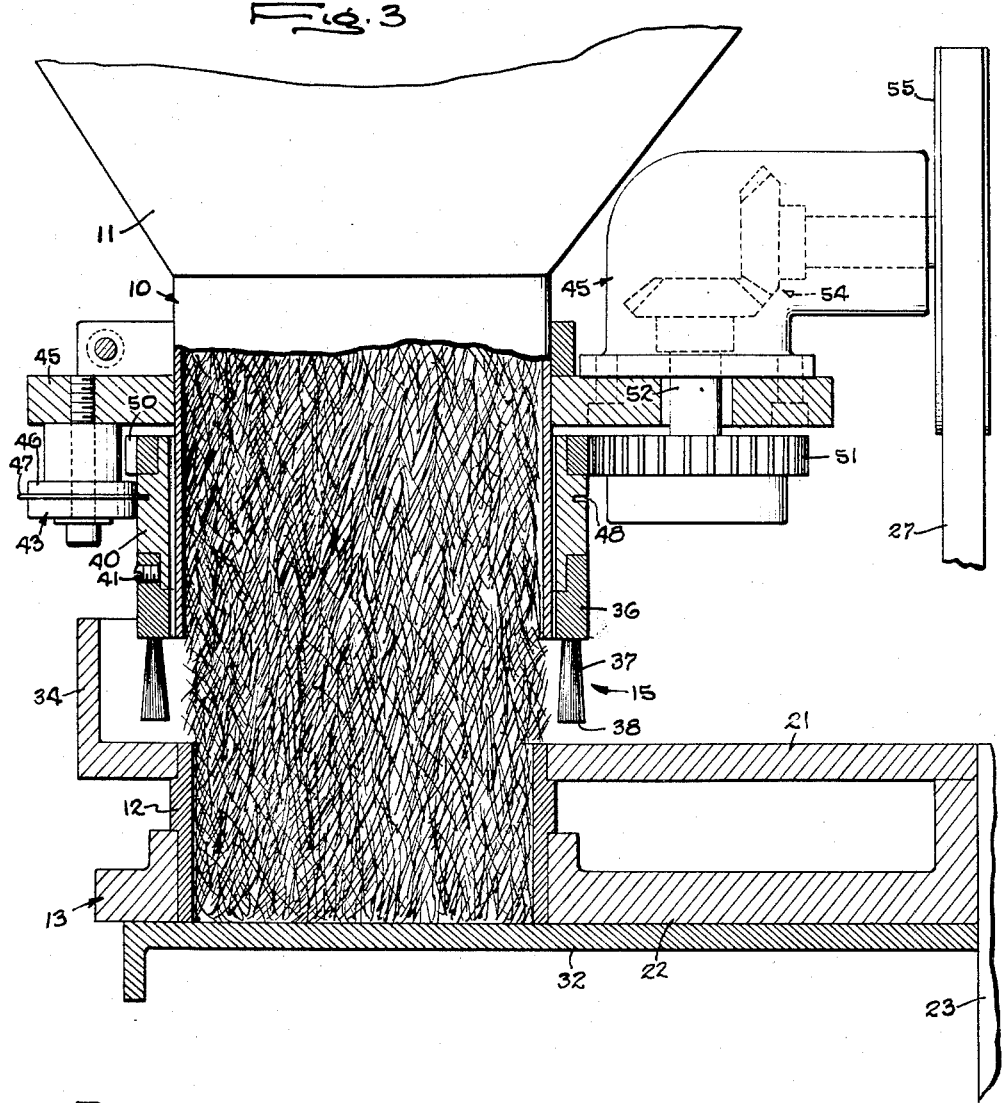
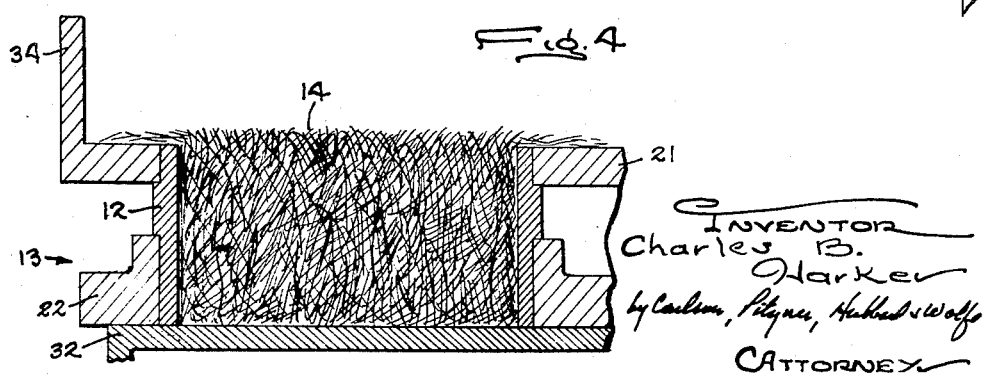
INVENTOR
Charles B. Harker
by Carlson, Pitzner, Hubbard & Wolfe
ATTORNEY

United States Patent Office 2,933,220
Patented Apr. 19, 1960

2,933,220

DISPENSING DEVICE

Charles B. Harker, Rockford, Ill., assignor to Bartelt Engineering Company, Rockford, Ill., a corporation of Illinois Application July 3, 1957, Serial No. 669,756

3 Claims. (Cl. 222—352)

This invention relates to a dispensing device in which solid particles are discharged through a spout into a measuring receptacle and which includes a brush for leveling the top surface of the particles in the receptacle. More particularly, the present invention relates to a device for dispensing and accurately measuring a quantity of fibrous, stringy, or strand-like particles, such as pipe tobacco, which are difficult to dispense in uniform and equal quantities.

The principal object of the present invention is to provide a new and improved dispensing device of the above character in which the top surface layer of particles in a measuring receptacle is uniformly and evenly leveled off so as to prevent either an excess or a deficiency of such solid particles in the receptacle.

A more specific object of the present invention is to mount the brush for rotation about the spout so as to sweep off the excess particles from the upper surface layer of particles in the measuring receptacle.

A further and more detailed object of the present invention is to extend the rotary brush beyond the discharge end of the spout and with its brushing end spaced above the upper surface of the measuring receptacle so that the top surface layer of particles in the receptacle is leveled and the fibrous particles therein are neither compacted within nor pulled out from the receptacle.

Other objects and advantages will become apparent as the following description proceeds, taken in connection with the accompanying drawings, wherein:

Figure 1 is a fragmentary side view of a dispensing and measuring device embodying the novel features of the present invention.

Fig. 2 is an enlarged side view, partly in section, taken substantially in the plane of line 2—2 of Fig. 1, and showing the novel features in more detail.

Fig. 3 is a fragmentary plan view taken substantially in the plane of line 3—3 of Fig. 1 and showing an illustrative driving mechanism for use with the present invention.

Fig. 4 is a detail view of a measured amount of solid material accomplished by a device embodying the present invention.

For purposes of illustration, the invention is shown, in the drawings, embodied in a dispensing and volumetric measuring device comprising an elongated upright spout 10 through which solid particles, such as strands of pipe tobacco, are discharged. The fibrous strand material is stored in a suitable hopper 11 which retains a continuous supply of such material. Solid particles are discharged from the spout 10 into volumetric measuring receptacles 12 carried on a receptacle turret 13 which is intermittently indexed by a suitable drive mechanism to position empty measuring receptacles 12 beneath the spout 10 for filling. As the turret rotates, the top surface layer 14 (Fig. 4) of the particles in the receptacle 12 is leveled by a sweeping member or brush 15. Simultaneously, the filled receptacles are indexed to a succeeding station where the solid particle contents are emptied into a discharge spout 16 (Fig. 1). From the discharge spout 16 the measured amount of solid particles passes into a package 18 such as an expanded bag or container carried in a suitable package forming and closing machine 19. With this arrangement, a measured quantity of pipe tobacco is dispensed from the hopper 11 through the spout 10 and into the measuring receptacle 12 at one station and from the receptacle the tobacco is discharged through a discharge spout 16 into the ultimate container 18 at a succeeding station. When the measuring receptacle is empty it is then indexed to the filling station and the cycle is repeated.

The receptacle turret 13 comprises a pair of spaced disks 21, 22 mounted on a vertical shaft 23 journaled on a support or frame 24. The shaft 23 is intermittently driven to rotate and index the disks 21, 22 by a suitable gear transmission 25 which is drivingly connected by a shaft 26 which may be driven by a suitable intermittent drive mechanism (not shown). Carried by the receptacle turret are a plurality of the measuring receptacles 12 in the form of sleeves extending between the disks 21, 22 and opening into the upper surface of the upper disk 21 and the lower surface of the lower disk 22. By varying the length of the sleeves forming the measuring receptacles 12, and accordingly the spacing between the disks 21, 22, the volume of the receptacles 12 can be changed to suit the size of the container being filled.

During the filling and indexing of the measuring receptacles, the receptacle opening in the bottom surface of the lower disk 22 is closed by a plate 32 having a flat upper surface of an extent corresponding to the size of the turret and extending radially beyond the receptacle. This plate, however, includes suitably spaced apertures (not shown) corresponding to the measuring receptacle opening in the lower disc at the station where the contents are to be discharged into the container 18 through the spout 16. The upper disk 21 carries, adjacent its outer peripheral edge, an upstanding wall or flange 34 which serves to contain excess particles which are spilled between the measuring receptacle and the supply spout.

In the packaging of fibrous, coarse-grained, stringy, strand-like materials, such as pipe tobacco, for example, which is packed in the form of fibrous strands, and may have a length between one-half and one inch, by automatic machinery, difficulties are encountered in maintaining an accurate measure of the solid particles within close tolerances so that the packages all contain a constant uniform quantity. In such packaging operations it has been found, when a brush is swept across the surface of the measuring receptacle to remove excess particles, that the strands of tobacco are either compacted into the receptacle or are pulled therefrom, leaving a noticeable deficiency of tobacco in the container.

The present invention contemplates the provision of a novel means for leveling the top surface of the layer 14 of fibrous, strand-like particles in the measuring receptacle 12, after the particles have been discharged from the supply spout 10 thereinto, so that a uniform measured amount of the particles remains in the receptacle. For this purpose a sweeping member, here shown as a brush 15, is employed. This brush 15, in the present instance, comprises an annular holder 36 surrounding the discharge end of the supply spout and carrying a plurality of tufts 37 of bristles depending therefrom below the spout and into proximity with the upper receptacle turret disk 21.

For purposes of preventing the compacting or removal of particles in the receptacle, the brush 15 continuously rotates during operation of the filling and measuring mechanism to provide a rotary shearing action against the top surface layer 14 of the particles as the turret 13 rotates to index a filled receptacle to the discharge station. It has been found that to obtain the most satisfactory shearing action the brush should rotate fairly slowly. To further enhance the shearing action and to aid in preventing the compacting or depletion of tobacco strands in the measuring receptacle 12, the lowermost ends 38 of the tufts of bristles 37 are spaced slightly above the upper surface of the measuring receptacle as defined by the upper disk 21. By using a slowly rotating brush and with the above described spacing, the tendency of the strands of tobacco to wedge or catch between the brush and receptacle is eliminated and it has been found possible to obtain a level surface and a constant density of packing within the measuring receptacle (Fig. 4).

Suitable means are provided for imparting a rotary motion of the brush 15. One illustrative means is shown in the drawings and comprises an annular hub 40, to which the annular brush holder is secured in any suitable manner as by set screws 41 for example. The hub is mounted for rotation about the supply spout 10 and is drivingly connected to the drive mechanism of the machine. Supporting the hub for rotation are a plurality (for example, three as shown in Fig. 3) of circumferentially spaced ball bearing assemblies 43 the inner race of which is secured to a bracket 45 mounted on the supply spout. The outer race 46 of the bearing assembly 43 carries an annular flange 47 supportingly engageable in a corresponding circumferential slot 48 in the hub 40.

For driving the hub 40, a drive gear 50 is mounted thereon and meshes with a pinion 51 the shaft 52 of which is journaled in the bracket 45 on the spout 10. The pinion 51 is continuously driven by a motor 29 through a belt 27 and a suitable gear train indicated generally at 54. The belt passes around a pulley 28 on the output shaft of the motor, an idler pulley 28a and a pulley 55 connected to the gear train 54. The speed of rotation of the brush is determined by the gear and pulley ratios between the hub 40 and the drive motor of shaft 29.

It will be observed that the measuring receptacle 12 will be uniformly loaded in each cycle of the machine, that is the rotating brush 15, spaced a short distance from the mouth of the receptacle 12, sweeps off the excess particles from the top surface layer thereof without compacting or pulling strands of the particles out of the measured volume. A constant volumetric filling mechanism particularly useful for measuring quantities of fibrous, stringy, strand-like material, such as pipe tobacco, has thus been described.

I claim as my invention:

1. In a metering device for measuring fibrous solid particles from a hopper mounted on a support frame and including a spout extending downwardly therefrom and having an open lower end for discharging solid particles from the hopper, the combination comprising, a measuring receptacle positionable beneath the spout for receiving particles therefrom, means for intermittently moving said measuring receptacle transversely relative to the spout, an annular brush surrounding the spout and extending below the open lower end into sweeping proximity with said receptacle, and means for rotating said brush so that it levels the surface of solid particles in said receptacle as said receptacle is moved transversely relative to the spout.

2. In a metering device for measuring fibrous solid particles from a hopper mounted on a support frame and including a spout extending downwardly therefrom and having an open lower end for discharging particles from the hopper, the combination comprising, a measuring receptacle turret journaled on the support frame and carrying thereon a plurality of measuring receptacles positionable beneath the spout for receiving particles therefrom, means for intermittently moving said turret transversely relative to the spout to position an empty receptacle beneath the spout and to remove a full receptacle from under the spout, means for driving said intermittent moving means, an annular rotatable brush surrounding the spout and extending below the open lower end thereof into sweeping proximity with said turret, and means operatively connecting said brush with said driving means for rotating said brush so that it levels the surface of solid particles in said receptacle as said receptacle is moved transversely relative to the spout.

3. In a metering device for measuring fibrous solid particles from a hopper mounted on a support frame and including a spout extending downwardly therefrom and having an open lower end for discharging particles from the hopper, the combination comprising, a measuring receptacle turret journaled on the support frame and carrying thereon a plurality of measuring receptacles, means for intermittently indexing said turret transversely to the spout to position an empty receptacle beneath the spout for receiving particles therefrom and to remove a full receptacle from beneath the spout, means for driving said indexing means, an annular hub surrounding the spout, means including a plurality of bearing members mounted on the frame for supporting said hub for rotation about the spout, an annular brush secured to said hub and extending below the open end of the spout into sweeping proximity with said receptacle, and means operatively connecting said driving means and said hub for rotating the latter and thereby rotating said brush so that said brush levels the surface of solid particles in said receptacle as said turret is indexed to move a filled receptacle transversely relative to the spout.

References Cited in the file of this patent

UNITED STATES PATENTS

| | | |
|---|---|---|
| 31,530 | Cluxon | Feb. 26, 1861 |
| 2,144,569 | Frazier | Jan. 17, 1939 |
| 2,590,817 | Fenno | Mar. 25, 1952 |
| 2,729,380 | Malhiot | Jan. 3, 1956 |